(12) United States Patent
Jakubowski et al.

(10) Patent No.: US 9,916,439 B2
(45) Date of Patent: Mar. 13, 2018

(54) SECURING A COMPUTING ENVIRONMENT AGAINST MALICIOUS ENTITIES

(75) Inventors: Mariusz H. Jakubowski, Bellevue, WA (US); Marcus Peinado, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 112 days.

(21) Appl. No.: 13/427,342

(22) Filed: Mar. 22, 2012

(65) Prior Publication Data

US 2013/0254829 A1    Sep. 26, 2013

(51) Int. Cl.
*G06F 21/00* (2013.01)
*G06F 21/53* (2013.01)

(52) U.S. Cl.
CPC .................... *G06F 21/53* (2013.01)

(58) Field of Classification Search
CPC .......... G06F 21/53; G06F 21/00; G06F 21/50; G06F 21/52; G06F 21/10; H04L 29/06578; H04L 29/06986; H04L 63/0227; H04L 63/0254; H04L 63/20
See application file for complete search history.

(56) References Cited

U.S. PATENT DOCUMENTS

| 7,921,686 B2 | 4/2011 | Bagepalli et al. | |
| 2003/0154296 A1* | 8/2003 | Noguchi | H04L 63/0236 709/229 |
| 2003/0177390 A1 | 9/2003 | Radhakrishnan | |
| 2003/0195858 A1* | 10/2003 | Watanabe | G06Q 20/0855 705/75 |
| 2005/0044224 A1* | 2/2005 | Jun | G06Q 20/10 709/225 |
| 2005/0091661 A1* | 4/2005 | Kurien | G06F 21/53 719/310 |
| 2007/0069005 A1* | 3/2007 | Dickerson | G06Q 20/40 235/379 |
| 2008/0130893 A1* | 6/2008 | Ibrahim | G06F 21/572 380/277 |

(Continued)

OTHER PUBLICATIONS

Phung, Phu H., "Lightweight Enforcement of Fine-Grained Security Policies for Untrusted Software", <www.cse.chalmers.se/~phung/phdthesis/thesis.pdf>, Sep. 12, 2011, 96 pages.

(Continued)

*Primary Examiner* — William Goodchild

(57) ABSTRACT

The subject disclosure is directed towards securing network data traffic through a trusted partition of the computing environment. A proxy service may communicate transaction data from a client to security-critical code within the trusted partition, which compares the transaction data to a security policy from a commercial electronic entity. If the transaction data includes malicious content, a security component framework of the trusted partition may reject the transaction data and terminate communications with the client. If the transaction data does not include malicious content, the security component framework may communicate a secured version of the transaction data and retrieve response data from the commercial electronic entity, which may be further communicated back to the client.

20 Claims, 6 Drawing Sheets

(56) References Cited

U.S. PATENT DOCUMENTS

| | | | | |
|---|---|---|---|---|
| 2009/0063354 | A1* | 3/2009 | Sheets | G06Q 20/04 705/75 |
| 2009/0138893 | A1* | 5/2009 | Borah | G06Q 10/087 719/313 |
| 2009/0265760 | A1 | 10/2009 | Zhu et al. | |
| 2011/0093618 | A1* | 4/2011 | Tso | G06Q 30/04 709/246 |
| 2012/0166483 | A1* | 6/2012 | Choudhary | G06F 17/30545 707/770 |
| 2012/0290483 | A1* | 11/2012 | Hezrony | G06Q 20/027 705/71 |

OTHER PUBLICATIONS

Santos et al., "Trusted Language Runtime (TLR): Enabling Trusted Applications on Smartphones", Eleventh Workshop on Mobile Computing Systems and Applications (HotMobile '2011), <research.microsoft.com/en-us/um/people/alecw/hotmobile-2011.pdf>, Mar. 1-2, 2011, 6 pages.

Jammalamadaka et al., "Middleware Support for Protecting Personal Data from Web Based Data Services", Proceedings of the 4th Middleware Doctoral Symposium (MDS '07), <http://citeseerx.ist.psu.edu/viewdoc/download?doi=10.1.1.134.9878&rep=rep1&type=pdf>, Nov. 2007, 6 pages.

Parno et al., "CLAMP: Practical Prevention of Large-Scale Data Leaks", 30th IEEE Symposium on Security and Privacy (MDS '07), <http://citeseerx.ist.psu.edu/viewdoc/download?doi=10.1.1.150.1546&rep=rep1&type=pdf>, May 17-20, 2009, 17 pages.

Reshef et al., "Web Application Security", Fourth Internet Security Conference (TISC '00), <http://www.cgisecurity.com/lib/reschef.pdf>, Apr. 2000, 12 pages.

Bittau et al, "Wedge: Splitting applications into reduced-privilege compartments", Proceedings of the 5th USENIX Symposium on Networked Systems Design and Implementation, NSDI'08, <http://www.cs.ucl.ac.uk/staff/b.karp/wedge-nsdi2008.pdf>.

Brumley et al., "Privtrans: Automatically partitioning programs for privilege separation", USENIX Security Symposium, <http://www.cs.berkeley.edu/~dawnsong/papers/privtrans.pdf>, 2004.

Chong et al., "Secure Web applications via automatic partitioning", SOSP '07, <https://www.cs.cornell.edu/~qixin/papers/swift.pdf>, 2007.

Chong et al., "SIF: Enforcing confidentiality and integrity in Web applications", 16th USENIX Security, <http://www.cs.sunysb.edu/~stoller/cse592/chong07sif.pdf>, 2007.

"Elastic Compute Cloud", <http://aws.amazon.com/ec2/>, 2011.

Daswani et al. "Mod Anti-Malware Lite", <http://modantimalware.sourceforge.net/>, 2011.

"Web Capacity Assessment Tool 6.3", Microsoft Corporation, <http://www.iis.neti>, 2010.

"Azure Platform", Microsoft Corporation, <http://www.microsoft.com/windowsazurei>, 2011.

Cova et al., "Detection and analysis of drive-by-download attacks and malicious JavaScript code", World Wide Web Conference Series, <http://cs.ucsb.edu/~chris/research/doc/www10_jsand.pdf>, 2010.

Gentry, Craig, "A fully homomorphic encryption scheme", PhD thesis, <http://crypto.stanford.edu/craig/craig-thesis.pdf>, 2009.

Zdancewic et al., "Secure Program Partitioning", ACM Transactions on Computer Systems, <http://cims.clayton.edu/jpreston/8530/Papers%20Not%20used/p283-zdancewic.pdf>, 2002.

McCune et al., "Flicker: An Execution Infrastructure for TCB Minimization", EuroSys, <http://www.ece.cmu.edu/~ece732/readings/eurosys053-mccune-cr.pdf>, 2008.

Yang et al., "A Unified Platform for Data Driven Web Applications with Automatic Client-server Partitioning", 16th International World Wide Web Conference, <http://www.cs.cornell.edu/~qixin/papers/hilda.pdf>, 2007.

Niazario, Jose, "PhoneyC: A Virtual Client Honeypot", 2nd USENIX Conference on Large-Scale Exploits and Emergent Threats: Botnets, Spyware, Worms and More, <http://www.usenix.org/events/leet09/tech/full_papers/nazario/nazario.pdf>, 2009.

Parno et al., "Memoir: Practical State Continuity for Protected Modules", the IEEE Symposium on Security and Privacy, <http://www.ece.cmu.edu/~jmmccune/papers/PLDMM2011.pdf>, May 2011.

Smith et al., "Refactoring Programs to Secure Information Flows", 2006 Workshop on Programming Languages and Analysis for Security, <http://www.cs.jhu.edu/~mthober/papers/smith-thober-plas06.pdf>, 2006.

Wang et al., "Secure Ranked Keyword Search over Encrypted Cloud Data", 2010 IEEE 30th International Conference on Distributed Computing Systems, <http://www.ece.iit.edu/~ubisec/cloud/papers/ICDCS10-search.pdf>, 2010.

"ARM Architecture", Wikipedia, <http://en.wikipedia.org/wiki/ARM_architecture>, 2011.

"Extended Validation Certificate", Wikipedia, <http://en.wikipedia.org/wiki/Extended_Validation_Certificate>, 2011.

"Information Security", Wikipedia, <http://en.wikipedia.org/wiki/Information_security>, 2011.

"Trusted Execution Technology", Wikipedia, <http://en.wikipedia.org/wiki/Trusted_Execution_Technology>, 2011.

* cited by examiner

SECURING A COMPUTING ENVIRONMENT AGAINST MALICIOUS ENTITIES

BACKGROUND

Conventional commercial electronic entities are prone to being attacked by malicious entities. Software and/or hardware components of these malicious entities may be configured to exploit vulnerabilities and/or surreptitiously achieve access to client sensitive information. For these reasons, modern computing software and/or hardware providers engage in continuous and reactive security technique development. One general security approach implements an application splitting concept, which involves partitioning an application code base into two or more components in which at least two components have different privilege levels. One goal of this approach is to restrict vulnerabilities to code within non-privileged components to protect the entire application code base while limiting a total size of security-critical or privileged components.

The code partitioning approach requires many steps, including manual steps, starting with partitioning the application code base by having developers annotate code segments and identify privileged data (e.g., code). Then, the developers use automated code-refactoring tools to rewrite the annotated application code base into the privileged and the non-privileged components that, when compiled as a whole, build functionally equivalent, secured versions of the application. Despite such partitioning, the malicious entities continue to successfully exploit the vulnerabilities within the non-privileged components when attempting to access and compromise the privileged components.

The code partitioning approach may not be applicable to certain systems, such as enterprise computing systems due to complexity, which may include complex interactions between system components. One example of an enterprise computing system may be a configuration where one or more machines execute programs (e.g., web roles) that manage data stored within a back-end database service and run a presentation layer and scripting subsystem. Complicated data communications between devices within the enterprise computing system render code partitioning impractical.

Although a single machine may be capable of running the web application, the commercial electronic entities often desire cost-effective, scalable computing capabilities in the form of cloud computing services. The commercial electronic entities also desire to be secure from insider attacks by malicious administrators and other entities with full control over a cloud computing environment in addition to external incursions by malicious computers on the pretense of conducting legitimate commerce. The prevalence of such attacks may be linked to occurrences when sensitive information for Internet transactions becomes vulnerable to misappropriation, for example, instances when the sensitive information is maintained in client-server requests/replies (e.g., in plaintext form) that are transmitted via a browser component.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards securing a computing environment against malicious entities. In one aspect, the computing environment may include a separate, protected execution environment on which to run a trusted partition of an online web application code base for managing one or more commercial electronic entities. The trusted partition may include security-critical and/or privileged code while a significant amount of the online web application code base may be stored in an untrusted partition on another computer or set of computers. From the protected execution environment, the trusted portion operates a proxy service for intercepting transaction data between client computers and the untrusted partition.

In one aspect, the trusted partition may include a security component framework to protect higher-level untrusted partition functionality, such as the integrity of an entire transaction in which a commercial electronic entity expects to receive a precise online order and the client expects to be charged exactly as indicated during online checkout. The security component framework may be configured to protect sensitive data being exchanged between the client and a web application associated with the commercial electronic entity.

The security component framework also may employ various techniques to provide sensitive data security in environments where external machines are adversarial and/or malicious entities that may have physical access rights to the commercial electronic entity. The security component framework may be configured to protect the client computers from adversarial content that may attempt to exploit client-side vulnerabilities. For example, the security component framework may prevent an adversary from deceiving the client into revealing the sensitive data through fraudulent web forms and/or the like.

In another aspect, an isolation mechanism may restrict access to the protected environment and configure a secure machine to execute the trusted partition, which permits the commercial electronic entity to host web application related services on cloud computing resources without incurring additional security risks and/or reduce a size of the trusted partition. The secure machine may perform security policy enforcement, including web page authentication, sensitive data encryption, checkout form partitioning and/or any combination thereof, on any web page content exchanged between the client computers and the commercial electronic entity. The secure machine also may send sensitive web pages directly to the clients instead of relying on the web application on the untrusted partition.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
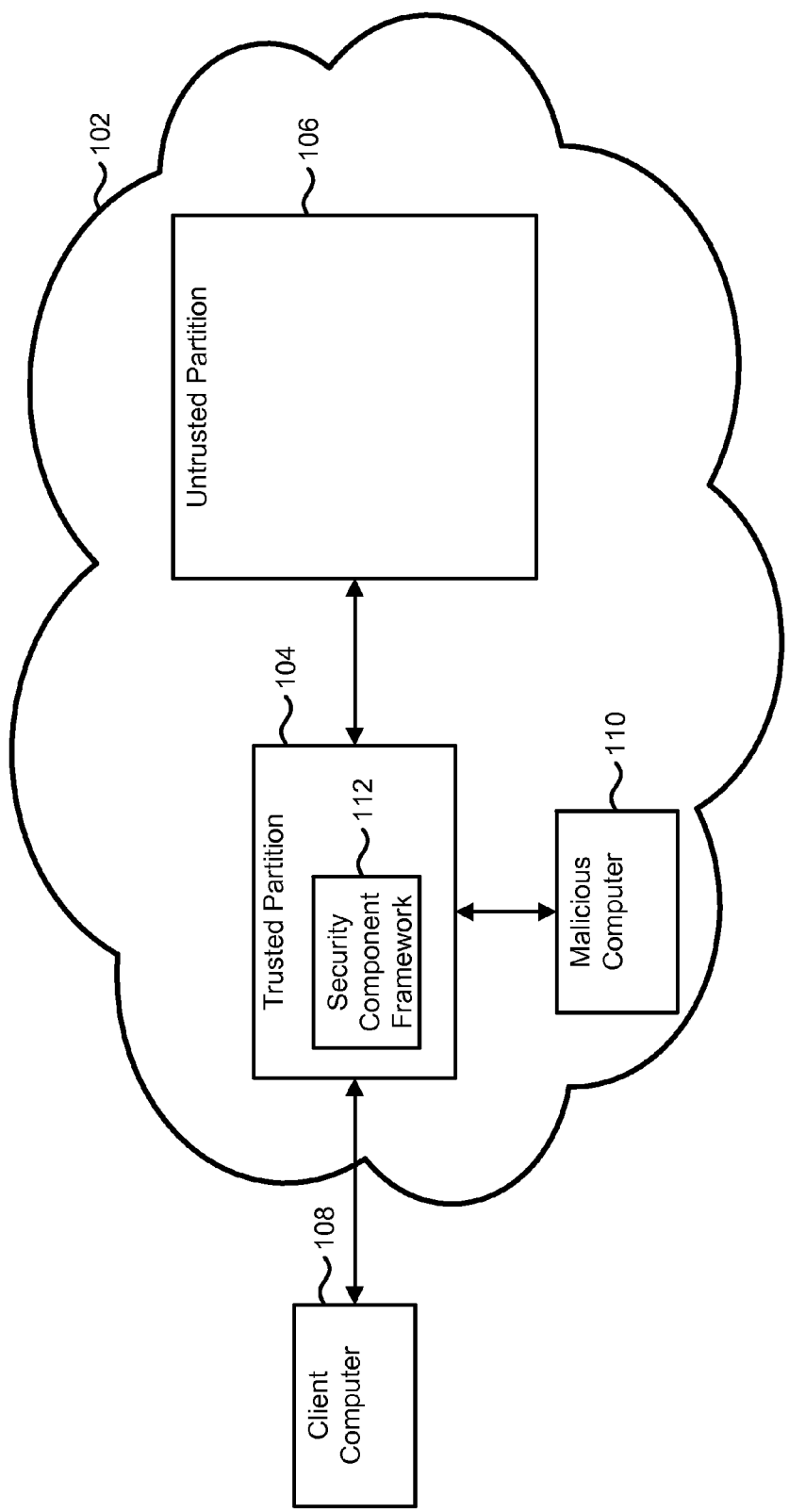
FIG. 1 is a block diagram illustrating an example system for securing transaction data and protecting an electronic commercial entity from malicious transactions according to one example implementation.

Various aspects of the technology described herein are generally directed towards a secure machine within a computing environment that operates a proxy service for network data traffic that is directed to a commercial electronic entity. The technology described herein may enable secure transaction processing on untrusted machines via code partitioning in which the secure machine executes security-critical code in a protected/isolated execution environment (e.g., a trusted partition of the computer environment) and the untrusted machines execute any remaining web application code for the commercial electronic entity. The security-critical code running within the protected environment may be configured to secure any sensitive data from misappropriation. The secure machine and the untrusted machines may include virtual machines running on a single computer or a configuration of computing resources (e.g., a set of computers).

In one example implementation, an administrative component corresponding to the protected execution environment may select one or more security components (e.g., a web page code parser, a proxy server and/or the like) as the security-critical code and provision other, non-security components on the untrusted machines. The administrative component may configure the one or more selected security components for the secure machine into a security component framework in order to ensure confidentiality and integrity of a transaction, such as an Internet transaction, to which a client and the commercial electronic entity are parties. The administrative component also may allocate sufficient computing resource capacities for an isolation mechanism to form the protected execution environment and run the secure machine.

The secure machine may use the security component framework to provide end-to-end protection of sensitive inputs, such as credit card/debit card data, to an electronic document (e.g., a web page) provided by the web application (e.g., cloud computing-based web applications) running on the untrusted machine. The secure machine may use the security component framework to perform security policy enforcement, including web page authentication, sensitive data encryption, web form partitioning and/or any combination thereof, on any electronic content exchanged between client computers and the web application. The commercial electronic entity may record directives in the security policy that automate the secure machine's operation of the security component framework with respect to recently arrived web page content.

According to one example implementation, when the client (e.g., an Internet user) enters data for an electronic payment instrument, such as a credit card, a debit card and/or the like, into a web form, such as the checkout form, the security component framework may provide a secure communication channel to protect the electronic payment instrument data until stored within the secure machine. The sensitive data within form fields may be encrypted prior to transmission of the entire web form to the web application for the commercial electronic entity. After completing one or more processing tasks, the web application may return an updated web form, or specific form fields thereof, to the secure machine. The secure machine may decrypt the electronic payment instrument data and use a secure channel to a corresponding financial institution to charge an agreed upon price to an account. The secure machine may communicate transaction results (e.g., approved, declined and/or the like) to the client and/or the web application.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and secure computing in general.

FIG. 1 is a block diagram illustrating an example system for securing transaction data and protecting a commercial electronic entity from malicious transactions according to one example implementation. Components of the example system may include a computing fabric 102 for communicating data between a trusted partition 104 and an untrusted partition 106 within a computing environment (e.g., a cloud computing environment). The computing fabric 102 may refer to a configuration of storage and network resources that manages data traffic directed to machines within the computing environment. For example, the computing fabric 102 may facilitate transaction data transmission from a client computer 108 and/or a malicious computer 110 to the trusted partition 104. It is appreciated that while the malicious computer 110 is depicted to be within the computing fabric 102, the malicious computer 110 also may be external to the computing environment, such as a compromised computer running malicious software code.

The untrusted partition 106 may include web applications (e.g., an e-commerce application, a payment application and/or the like) running on one or more server computers on behalf of the commercial electronic entity. The untrusted partition 106 also may include operating systems and software frameworks, such as virtualization subsystems, databases, web servers and/or presentation layers. The trusted partition 104 may operate a proxy service for securing network traffic directed to the untrusted partition 106 from a client computer 108 and/or a malicious computer 110. When combined, the proxy service and the web applications may form at a least a portion of an application code base in which the proxy service and the web applications may represent trusted code (e.g., privileged code) and untrusted code, respectively.

The trusted partition 104 may use one or more mechanisms to maintain isolation from the untrusted partition 106, the client computer 108 and/or the malicious computer 110. The trusted partition 104, according to one example implementation, may be implemented as one or more physically separate computers (e.g., virtual machines) in a secure location, such as client premises or a private datacenter. In another example implementation, the trusted partition 104 may operate within a dedicated firewall computer system or a perimeter server. Yet another example implementation may maintain isolation for the trusted partition 104 by utilizing secure hardware components residing on a same physical computer or set of physical computers that implement the untrusted partition 106.

The trusted partition 104 may utilize various hardware and/or software components of a security component framework 112 to enforce security policies on data communications to the untrusted partition 106. Consider an example potential transaction in which the client computer 108 provides transaction data, the trusted partition 104 may secure sensitive data within the transaction data prior to communicating the transaction data to the untrusted partition or returning an alert as to a possible infection if a malicious threat is detected. Consider another example potential transaction in which the malicious computer 110 communicates malicious code hidden within (malicious) transaction data, a component within the security component framework 112 may identify the malicious code, delete the transaction data and terminate communications with the malicious computer 110.

The security component framework 112 may include a secure connection endpoint implementing an encryption protocol for securing network data traffic, such as a Transport Layer Security (TLS), Secure Sockets Layer (SSL) and/or the like. The client computers 108 connect to the trusted partition 104 via the secure connection endpoint, ensuring confidentiality and integrity of sensitive data over a network. A SSL/TLS certificate serves to authenticate the trusted partition 104 and establish a secure communication channel with the untrusted partition 106. If the secure connection endpoint implements a certain number (e.g., a minimum number) of features in the encryption protocol and code element dependencies are avoided, an efficient size of the trusted partition 104 may be maintained.

The security component framework 112 may execute a proxy component, such as a HyperText Transfer Protocol (HTTP) proxy server, that functions as an intermediary between a client browser component and the web applications of the untrusted partition 106. To illustrate an example operation, the proxy component receives the transaction data, applies a security policy to the transaction data and transforms the transaction data and the security policy into secure transaction data, which may be communicated to the untrusted partition 106. The proxy component also may apply the security policy to response data from the untrusted partition 106. For certain client requests, the proxy component may generate secure response data (e.g., pre-stored or automatically generated web pages) without contacting the untrusted partition 106.

The security component framework 112 may include various parsing components, such as components for parsing and rewriting portions of the transaction data and/or the response data, such as HTTP headers, HTTP responses, and HyperText Markup Language (HTML) pages. The security component framework 112 also may include a policy engine for managing and applying security policies. The policy engine may be configured to extract policy descriptions from policy manifests and enforce policy aspects on all communication between parties to Internet transactions.

Figure 2:
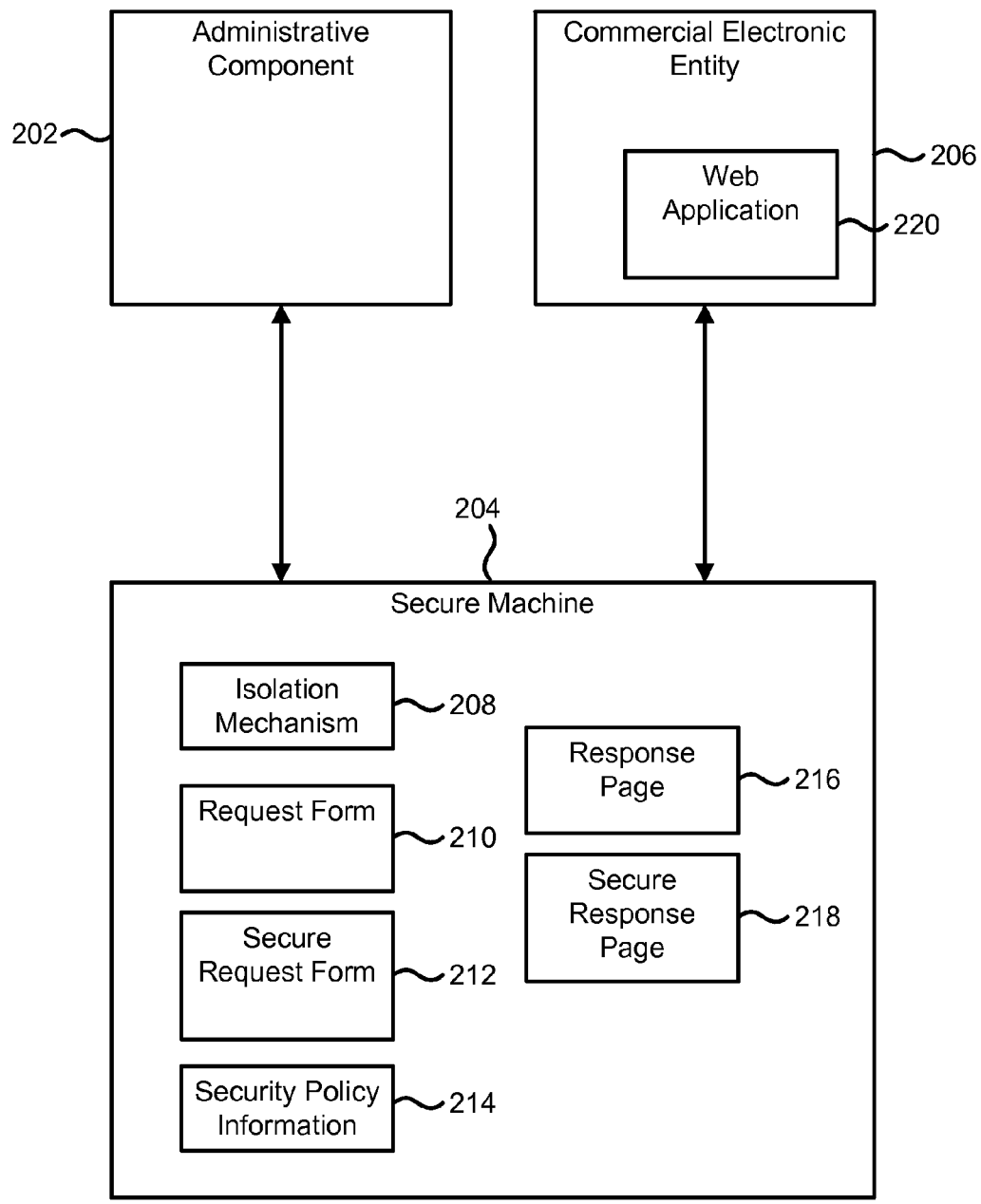
FIG. 2 is a block diagram illustrating an example system for configuring a secure machine to secure sensitive data within Internet transactions according to one example implementation.

FIG. 2 is a block diagram illustrating an example system for configuring secure machines to secure sensitive data within Internet transactions according to one example implementation. Components of the example system may include an administrative component 202, a secure machine 204 and a commercial electronic entity 206. Along with similar secure machines, the secure machine 204 may comprise an isolation mechanism 208 to maintain a trusted partition of a computing environment.

Within a cloud computing environment, the administrative component 202 may allocate various capacities of computing resources to build an instance of a type of virtual computing system component (e.g., a virtual machine, network communication device, cache memory, a hard drive and/or the like). For example, the administrative component 202 may partition a computer or set computing resources into separate virtual machines for executing trusted code or untrusted code associated with the commercial electronic entity 206. Hence, a single physical computer may run the secure machine 204 and the commercial electronic entity 206. The administrative component 202 may be configured to allocate any combination of the following example computing resources: networking resources, storage resources, virtualization resources, operating systems, software programs, processors, persistent storage, memory management, thread creation, synchronization primitives and/or the like. Alternatively, the computing resources also may be provided in a microkernel environment.

The administrative component 202 may configure the secure machine 204 with various components for protecting the trusted code (e.g., while being controlled by an adversary system). The administrative component 202 may include a trusted hypervisor component to separate the secure machine 204 from external (e.g., adversarial) virtual machines. The trusted hypervisor component may further prompt the isolation mechanism 208 to create a protected execution environment to run the secure machine 204. The secure machine 204 may be a virtual machine state comprising a set of computing resources (e.g., memory capacity, processor cycles and/or the like) that are protected from all other virtual machines, including the root partition. If both an operating system kernel and the trusted hypervisor components are compromised, processor security features, such as Intel® Trusted Execution Technology (TXT), may provide sufficient isolation.

Numerous example implementations where the isolation mechanism 208 transforms a request form 210 into a secure request form 212 using security policy information 214 are described herein. When a client completes the secure request form 212, that client becomes a party to a commercial transaction along with the commercial electronic entity 206. After the secure machine 204 submits the secure request form 212, the isolation mechanism 208 may receive a response page 216 from the commercial electronic entity 206. Similar to the request form 210, the isolation mechanism 208 may use the response page 216 to generate a secure response page 218 for transmission to the client.

The request form 210 and the secure request form 212 may include web pages where at least one HTML element is a form field. One known embodiment of such a web page is an online shopping checkout form for an e-commerce web site. The security policy information 214 may include policy manifest files from the commercial electronic entity 206 as well as private, isolation mechanism-specific encryption keys and/or authentication keys. The response page 216 and the secure response page 218 may include complementary versions of at least one HTML element that presents transaction status data to the client and/or the commercial electronic entity 206.

The isolation mechanism 208 may use an example security component to protect web page content integrity for the commercial electronic entity 206. The security policy information 214 may store hash values for different page content. The example security component, for instance, may use a corresponding hash value to authenticate the secure request form 212. Furthermore, the example security component may compute hash values for individual portions (e.g., fields or other entry points) of the secure request form 212. For example, specific HTML elements, such as sensitive form fields, may have individual hash values such that the client may only access secure form fields for sensitive data input.

When a web application 220 creates web pages for the commercial electronic entity 206, certain web page groups may present similar rendered content except for variations due to application platform. In order to maintain hash value verification accuracy, the security policy information 214 may specify regular expressions for identifying patterns in the rendered content to be excluded from hash value computation. For HTML pages, such patterns enable the exclusion of specific tagged regions (e.g., tagged HTML elements).

The isolation mechanism 208 may automatically encrypt sensitive data, such as electronic payment instrument data, within form fields of a web form. In one example implementation, the isolation mechanism 208 may include built-in secure hardware components (e.g., embedded CPU mechanisms) that encrypt the sensitive data before being stored into memory (e.g., cache memory, a local hard disk, a network shared logical unit (LUN) and/or the like), which prevents adversarial machines from successfully compromising the sensitive data.

After the client submits the request form 210, the isolation mechanism 208 may process plaintext field values in an HTTP request. Using encryption keys provided by the security policy information 214, the isolation mechanism 208 may modify the request form 210 by replacing original form field values with encrypted values, which prevents access to the plaintext form field values. After storing the modified version of the request form 210 as the secure request form 212, the isolation mechanism 208 may communicate the secure request form 212 to the commercial electronic entity 206, thereby completing a portion of an Internet transaction. Alternatively, the isolation mechanism 208 also may populate the secure request form 212 by sending the client a version of the secure request form 212 in which entered values are automatically encrypted. The isolation mechanism 208 may adjust form field attributes (e.g., data size and type) and any validation checks to maintain the sensitive data in the encrypted form fields (e.g., to accept a 32-byte hex-encoded AES-128 block instead of a 16-digit credit-card number).

The isolation mechanism 208 also may partition the request form 210 into a sensitive portion and a non-sensitive portion. The non-sensitive portion may be modification of the request form 210, as originally submitted, where each sensitive data form field is removed. All user inputs entered on the request form 210 will remain in plaintext. The sensitive portion may be a separate form that includes only sensitive fields. The isolation mechanism 208 generates the sensitive portion automatically and controls any content therein. Upon submission of the sensitive portion, the isolation mechanism 208 may encrypt all user-entered form field values and/or store an encoding of form data entered on the non-sensitive portion.

In one example transaction, the client may receive the non-sensitive portion, enter appropriate values and communicate the completed non-sensitive portion to the secure machine 204. The isolation mechanism 208 may process completed non-sensitive form data and generate the secure request form 212 comprising an encoding of the non-sensitive form data in addition to one or more encrypted form fields for securing the sensitive data. When the client enters data into the encrypted form fields and submits completed sensitive form data in the secure request form 212, the isolation mechanism 208 receives both the encoding and the encrypted form fields comprising the sensitive form data. The isolation mechanism 208 may encrypt the sensitive form data and combine the encrypted form data with the plaintext form data prior to communicating both sets of form data to the commercial electronic entity 206.

The secure request form 212 may include indicia authenticating the web application 220 when access rights to the secure machine 204 may be brokered via a secure uniform resource locator (URL). Alternately, the administrative component 202 may run a first secure machine for non-sensitive form data and a second secure machine for the sensitive form data. Both secure machines would access the same web server; however, the second secure machine can use a different secure URL (e.g., a different HTTPS port than the first secure machine), enabling the client to confirm the secure URL in the browser component's address line before submitting sensitive information.

The isolation mechanism 208 may utilize another security component for blacklisting and/or whitelisting page content. Certain HTML elements, such as scripts and inline frames, may provide an accessible attack surface for malicious computers to compromise exploitable vulnerabilities and commit misappropriation and/or fraud. The security policy information 214 may support blacklisting of specific HTML elements (tagged regions) via regular expressions. The other security component may parse and scan each web page for blacklisted patterns and upon finding matching content, remove such content and/or prevent transmission of the web page.

In one example implementation, it may not be possible to remove potentially blacklisted content without disrupting a transaction. To keep such applications functional, the security policy information 214 may be used by the isolation mechanism 208 to whitelist specific instances of blacklisted elements. For each such instance, the security policy information 214 may include a hash value for the exact HTML content. When analyzing the web page, the isolation mechanism 208 does not blacklist a tagged HTML region having a corresponding hash value that matches a hash value from the security policy information 214. An alternate approach for the isolation mechanism 208 is to allow only whitelisted page content, using blacklists to specify exceptions.

The isolation mechanism 208 may directly serve web pages from the secure machine 204 while bypassing the commercial electronic entity 206. As an example, web pages that cannot be inspected or verified by a security component (e.g., the policy engine), including exceptions to the security policy information 214 and content deemed too sensitive to be placed on the commercial electronic entity 206, may be stored in the security policy information 214. In one example implementation, the isolation mechanism 208 and the security policy information 214 operate as a memory cache for the web application 220 to improve performance for frequently accessed but seldom changing web pages.

Alternatively, the client computer issues a query (e.g., an SQL query) for a structured data store (e.g., a database system) that is maintained by the commercial electronic entity 206. The isolation mechanism 208 may use the security policy information 214 to parse the query into commands and data elements and to encrypt any sensitive data elements. In one alternate implementation, values within the structure data store may be encrypted in which instance the commercial electronic entity 206 may implement a private information retrieval (PIR) protocol that enables the web application 220 to access an encrypted data table from the structured data store without revealing which data table is being accessed. The isolation mechanism 208 returns the encrypted data table to the client in response to the query.

The security component framework of the isolation mechanism 208 may perform other operations to secure Internet transactions. For example, one security component may be configured to scan Web pages for malicious content, such as heap-spray attacks, data-stealing scripts, and other exploits. By filtering HTML content, this security component may also help prevent cross-site scripting and other traditional web attacks. Such a security component also may implement functionality found in web-oriented anti-malware tools.

The isolation mechanism 208 may add a security component (e.g., a plug-in) to the security component framework in order to extend functionality of the secure machine 204. The commercial electronic entity 206 may optionally provide an entity-specific security component, such as a binary module that exports a function to do additional computing tasks. Before and/or after security policy enforcement, the isolation mechanism 208 may store the request form 210 and/or the response page 216 in a data buffer and invoke a function of the entity-specific security component, which executes computing operations on the data buffer and returns a status code. The new security component, as an example, may be configured to decrypt a form field (e.g., credit card data) before passing a web request to a server (e.g., payment processor). The security component may perform one or more web-security operations, such as scanning for new attack patterns or behaviors beyond those covered by the security policy information 214.

Figure 3:
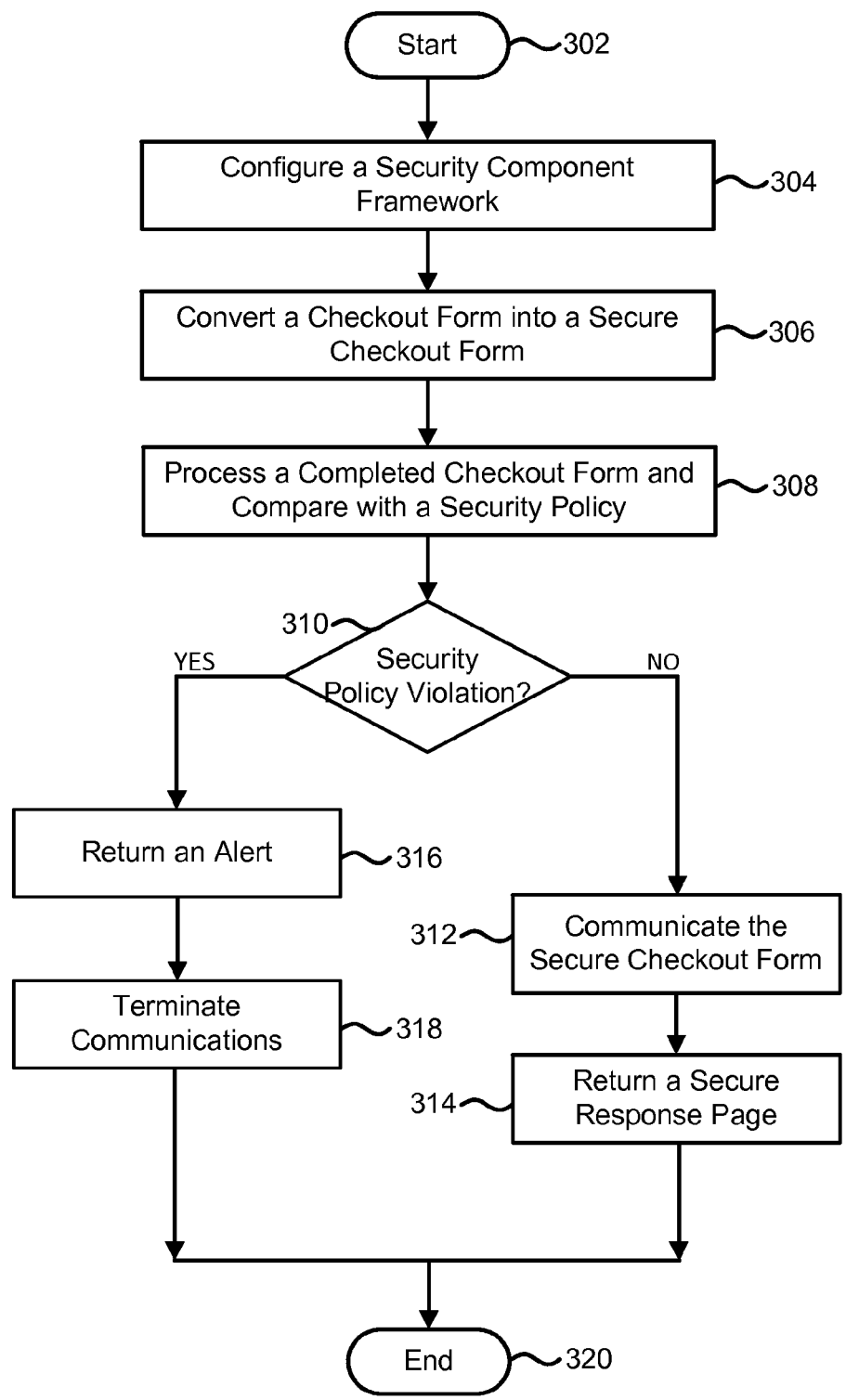
FIG. 3 is a flow diagram illustrating example steps for maintaining a trusted partition to secure network traffic for a commercial electronic entity according to one example implementation.

FIG. 3 is a flow diagram illustrating example steps for maintaining a trusted partition to secure network traffic for a commercial electronic entity according to one example implementation. The example steps commence as step 302 and proceeds to step 304 at which the isolation mechanism 208 configures a security component framework (e.g., the security component framework 112 of FIG. 1) to operate a proxy service for Internet transactions and prevent malicious misappropriation of sensitive data from web forms, such as a checkout form.

Step 306 converts the checkout form into a secure checkout form. According to one example implementation, hashed web form content, encrypted form fields, partitioned form data and/or any combination thereof may enable end-to-end sensitive data protection for the secure checkout form. Step 308 is directed to processing a completed secure checkout form and comparing the secure completed checkout form with a security policy.

Within the security policy, a web application stores a hash value of the secure checkout form into which the client enters sensitive data, such as electronic payment instrument data, and a set of HTML patterns to specify variable page content, such as tagged regions, that may be excluded from hash value computation. When the client returns the completed secure checkout form, the trusted partition may compute a hash value for each portion of the returned content (e.g., form fields). Verifying hash values of the completed secure checkout form prevents misappropriations of the sensitive form data including attempts to send the electronic payment instrument data to a malicious entity (e.g., the malicious computer 110 of FIG. 1). The security policy includes HTML names of sensitive form fields, such as electronic payment instrument verification code fields, whose values are to be automatically secured (e.g., encrypted) by the isolation mechanism 208.

The checkout form may be partitioned into a first partitioned form and a second partitioned form. Instead of having the client entering both sensitive data and non-sensitive data into the checkout form of which a malicious computer may misappropriate, the client may enter the non-sensitive data into the first partitioned form. The client may access the second partitioned form using a secure web application identity (e.g., port number for a URL to the commercial electronic entity) and safely enter the sensitive data. The trusted partition may combine plaintext field values from the first partitioned form and encrypted field values from the second partitioned form to automatically generate the secure checkout form, which may be communicated to the web application.

Step 310 determines whether the security policy comparison identifies a security policy violation associated with the secure checkout form. If the security policy violation did not occur, step 310 proceeds to step 312 where a proxy component of the security component framework is used to communicate the secure checkout form to the web application. Step 314 returns a secure response page using response data from the web application after which step 314 proceeds to step 320 and terminates the example steps depicted in FIG. 3.

If the security policy violation occurred, step 310 proceeds to step 316. Step 316 is directed to returning an alert informing the client of the security policy violation. Step 318 terminates communications with the client to protect the commercial electronic entity. Step 320 finalizes the cancellation of the attempted Internet transaction.

Figure 4:
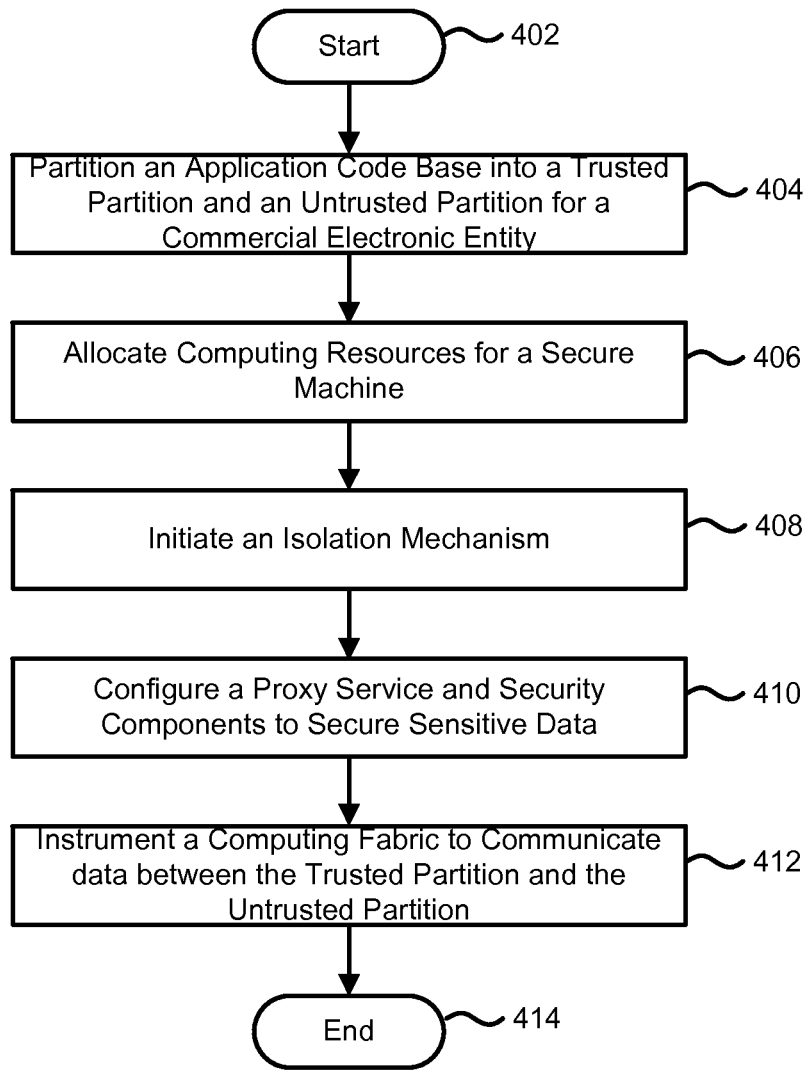
FIG. 4 is a flow diagram illustrating example steps for managing a secure machine within a computing environment according to one example implementation.

FIG. 4 is a flow diagram illustrating example steps for managing secure machines within a computing environment according to one example implementation. The example steps commence as step 402 and proceeds to step 404 at which the administrative component 202 partitions an application code base into a trusted partition and an untrusted partition. The application code base may implement a web application for a commercial electronic entity in which the trusted partition executes security components and the untrusted partition executes non-security related web application components.

Step 406 allocates computing resources for the trusted partition based on instructions from the commercial electronic entity. As an example, the commercial electronic entity may provide a security policy comprising authentication information (e.g., hash values) for web pages that may be served by the trusted partition directly or indirectly. The security policy also may identify web page elements for rendering content comprising sensitive data from the client. The security policy also may indicate an encryption scheme for securing the sensitive data. In another example, the commercial electronic entity may define computing resource capacities of which the administrative component 202 may use to generate the secure machine for running an instance of the trusted partition. The administrative component 202 may present the secure machine to other computers including external and/or internal computers to the cloud computing environment.

Step 408 initiates an isolation mechanism to generate the secure machine using the allocated computing resources. The administration component 202 may instruct the secure machine to execute the trusted partition. The isolation mechanism includes various software and/or hardware components that provide a separate execution environment from other virtual machines. These components protect code running within the separate execution environment from being compromised by code that is executed by the other virtual machines running on a same computer as the secure machine or on a different computer.

Step 410 configures the secure machine to operate as a proxy service for web application clients that desire to conduct transactions with the commercial electronic entity. The commercial electronic entity may further instruct the administrative component 202 to install security components on the secure machine. The security components may form a framework (e.g., the security component framework 112 of FIG. 1) for securing sensitive data, as described herein. The commercial electronic entity may further instruct the administrative component 202 to add entity-specific security components to the framework. The security components may cooperate to prevent malicious misappropriation of sensitive data from web forms, such as a check-out form.

Step 412 represents instrumentation of a computing fabric to communicate data between the trusted partition and the untrusted partition. Step 412 also may instrument the computing fabric to enable communications between the secure machine and the client computers. Establishing the secure machine as an online proxy service, on behalf of the commercial electronic entity, may involve assigning a network identity (e.g., a URL) to the secure machine to which transaction-related data may be routed. Another security component may create a secure communication channel for exchanging network traffic with client and/or malicious computers prior to the secure machine being brought online. Step 414 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
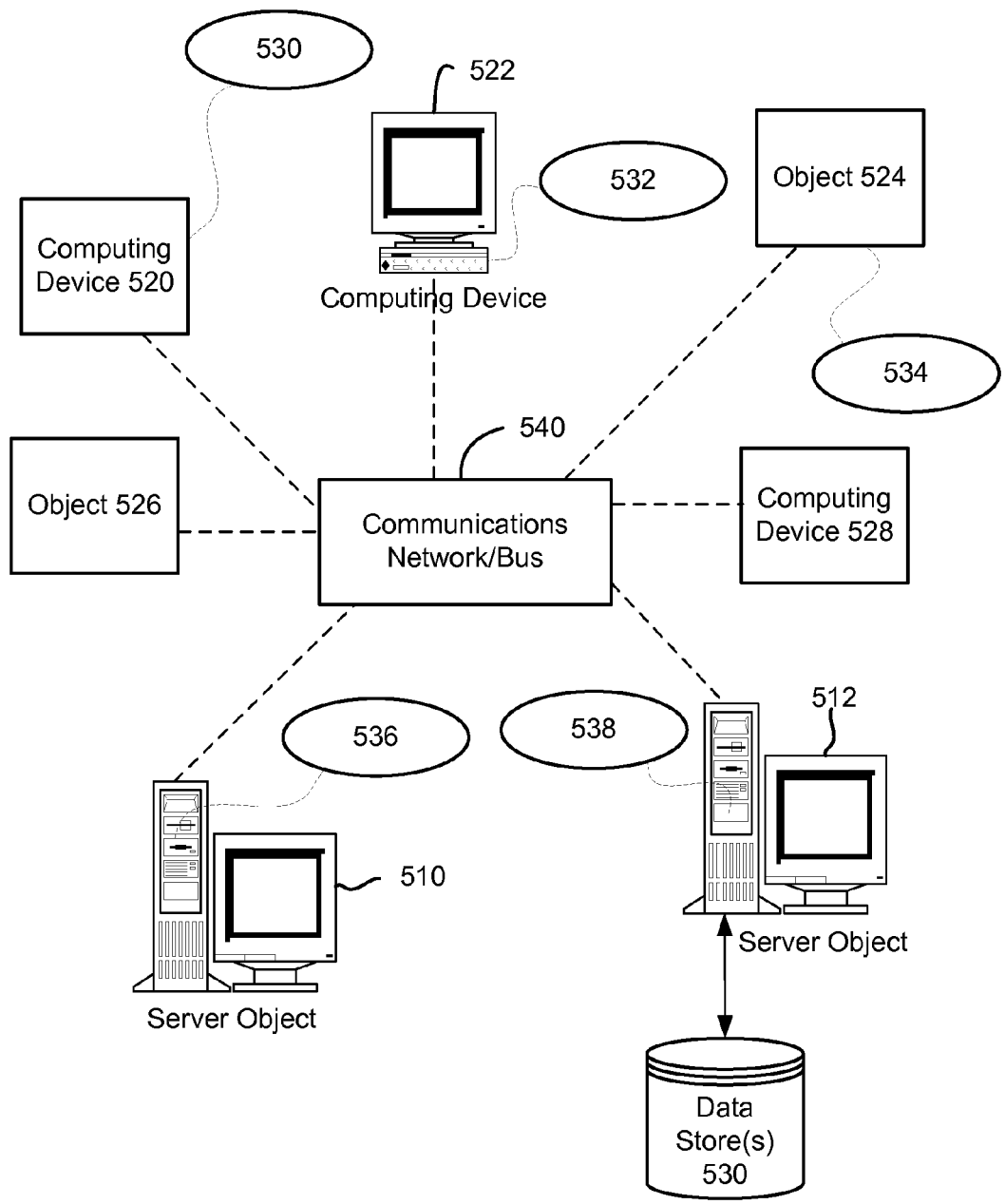
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
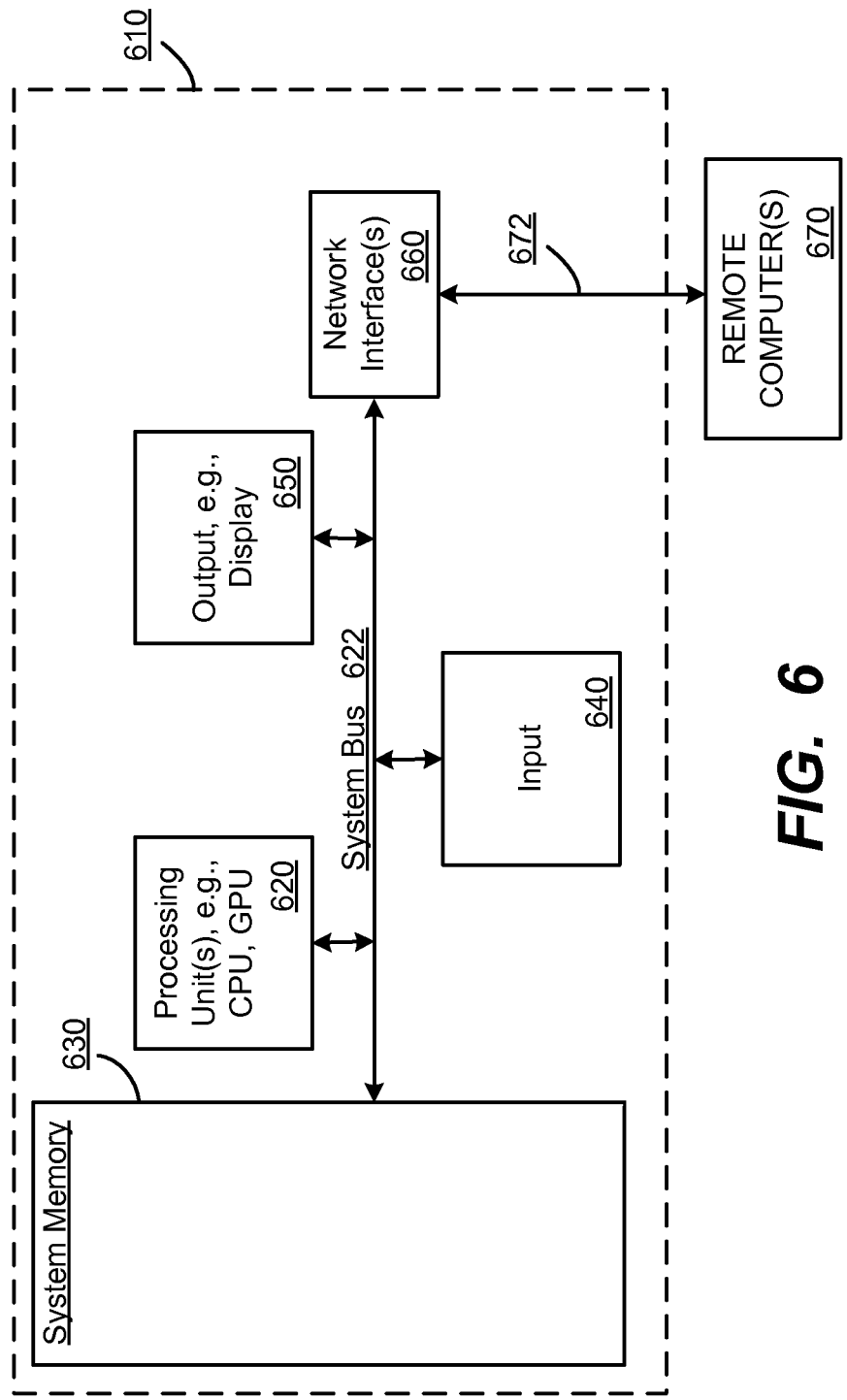
FIG. 6 is a block diagram representing an example non-limiting computing system or operating environment in which one or more aspects of various embodiments described herein can be implemented.

FIG. 6 thus illustrates an example of a suitable computing system environment 600 in which one or more aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method performed at least in part on at least one processor and operative to secure network data traffic through a trusted partition of the computing environment, the method comprising:
 processing transaction data directed to an untrusted partition of the computing environment via the trusted partition, the untrusted partition being associated with one or more commercial electronic entities;
 comparing security policy information to the transaction data to identify blacklisted markup language content and to whitelist portions of the identified blacklisted markup language content necessary for completing a transaction associated with the transaction data;
 modifying the transaction data to remove the identified blacklisted markup language content except for the whitelisted portions; and
 communicating, via a secure communication channel, the modified transaction data to the untrusted partition.

2. The method of claim 1, wherein comparing the security policy information to the transaction data further comprises removing HyperText Markup Language (HTML) elements matching regular expressions for blacklisted patterns.

3. The method of claim 1 further comprising terminating communications with any party to the transaction data that is in violation of the security policy information.

4. The method of claim 1 further comprising modifying response data provided by the one or more commercial electronic entities to include a complementary version of transaction status data.

5. The method of claim 1, wherein using the security component framework further comprises generating secure response data without contacting the untrusted partition.

6. The method of claim 1, wherein using the security component framework further comprises encrypting sensitive data being transmitted within the transaction data and replacing corresponding portions of the transaction data that comprise the sensitive data.

7. The method of claim 1, wherein using the security component framework further comprises authenticating data entry points corresponding to the transaction data.

8. The method of claim 1, wherein using the security component framework further comprises partitioning an electronic form document into a first portion comprising sensitive data entry points and a second portion comprising other data entry points.

9. The method of claim 1 further comprising executing an entity-specific security component of the security component framework on the transaction data.

10. The method of claim 1, wherein communicating the response data further comprises returning entity-specific content based on the transaction data.

11. One or more computer-readable storage memory having computer-executable instructions stored thereon, which in response to execution by a computer, cause the computer to perform steps comprising:
 processing a request form directed to a commercial electronic entity from a client computer, the request form comprising non-sensitive data and sensitive data;
 returning information to the client computer and terminate a connection to the commercial electronic entity in response to a security policy violation associated with the request form;
 if the request form satisfies a security policy, converting the request form into a secure request form with each sensitive data form field removed, communicating the secure request form to the commercial electronic entity, and using the sensitive data to complete a transaction with the commercial electronic entity; and
 upon receiving response data from the commercial electronic entity, generating secure response data to include a complementary version of transaction status data and communicating the secure response data to the client computer.

12. The one or more computer-readable storage memory of claim 11 having further computer-executable instructions, which in response to execution by the computer, cause the computer to perform further steps comprising:
returning web content presenting the secure response data.

13. The one or more computer-readable storage memory of claim 11 having further computer-executable instructions, which in response to execution by the computer, cause the computer to perform further steps comprising:
computing a hash value for at least one portion of the request form and comparing the hash value to security policy to verify the request form.

14. The one or more computer-readable storage memory of claim 11 having further computer-executable instructions, which in response to execution by the computer, cause the computer to perform further steps comprising:
excluding regions of the request form from hash value computations.

15. The one or more computer-readable storage memory of claim 11 having further computer-executable instructions, which in response to execution by the computer, cause the computer to perform further steps comprising:
generating a secure communication channel with the client computer.

16. An apparatus, comprising:
an isolation mechanism, executing on hardware, configured to:
process transaction data directed to an untrusted partition of the computing environment via the trusted partition, the untrusted partition being associated with one or more commercial electronic entities;
compare security policy information to the transaction data to identify blacklisted markup language content and to whitelist portions of the identified blacklisted markup language content necessary for completing a transaction associated with the transaction data;
modify the transaction data to remove the identified blacklisted markup language content except for the whitelisted portions; and
communicate, via a secure communication channel, the modified transaction data to the untrusted partition.

17. The apparatus of claim 16, wherein the isolation mechanism further configured to compare the security policy information to the transaction data further comprises removing HyperText Markup Language (HTML) elements matching regular expressions for blacklisted patterns.

18. The apparatus of claim 16, wherein the isolation mechanism further configured to terminate communications with any party to the transaction data that is in violation of the security policy information.

19. The apparatus of claim 16, wherein the isolation mechanism further configured to modify response data provided by the one or more commercial electronic entities to include a complementary version of transaction status data.

20. The apparatus of claim 16, wherein the isolation mechanism further configured to generate secure response data without contacting the untrusted partition.

* * * * *